(12) United States Patent
Ohmori et al.

(10) Patent No.: US 9,714,364 B2
(45) Date of Patent: Jul. 25, 2017

(54) PHOTO-CURABLE RESIN COMPOSITION

(71) Applicant: NISSAN CHEMICAL INDUSTRIES, LTD., Tokyo (JP)

(72) Inventors: Kentaro Ohmori, Funabashi (JP); Takeo Moro, Chiyoda-ku (JP); Yuki Endo, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/347,770

(22) PCT Filed: Sep. 24, 2012

(86) PCT No.: PCT/JP2012/074389
§ 371 (c)(1),
(2) Date: Mar. 27, 2014

(87) PCT Pub. No.: WO2013/047435
PCT Pub. Date: Apr. 4, 2013

(65) Prior Publication Data
US 2014/0235746 A1    Aug. 21, 2014

(30) Foreign Application Priority Data
Sep. 29, 2011  (JP) .................. 2011-214556

(51) Int. Cl.
C08F 2/46      (2006.01)
C08G 61/04    (2006.01)
C09J 4/00      (2006.01)
C08F 226/06   (2006.01)
C08K 5/37      (2006.01)

(52) U.S. Cl.
CPC ............. C09J 4/00 (2013.01); C08F 226/06 (2013.01); C08K 5/37 (2013.01)

(58) Field of Classification Search
None
See application file for complete search history.

(56) References Cited

U.S. PATENT DOCUMENTS

2011/0319589 A1* 12/2011 Takeyama et al. ........... 528/363

FOREIGN PATENT DOCUMENTS

| JP | B2-63-20255 | 4/1988 |
| JP | A-3-243626 | 10/1991 |
| JP | A-6-306172 | 11/1994 |
| JP | A-7-3025 | 1/1995 |
| JP | A-2001-26608 | 1/2001 |
| JP | A-2001-194510 | 7/2001 |
| JP | A-2002-182002 | 6/2002 |
| JP | A-2003-277505 | 10/2003 |
| JP | A-2005-139401 | 6/2005 |
| JP | 2006-012784 | * 1/2006 |
| JP | A-2006-12784 | 1/2006 |
| JP | A-2009-7430 | 1/2009 |
| JP | 2010-235874 | * 10/2010 |
| JP | 2011-052148 | * 3/2011 |
| JP | A-2011-52148 | 3/2011 |
| JP | 2011-225880 | * 11/2011 |
| JP | A-2011-225880 | 11/2011 |
| WO | WO 2010/092947 A1 | 8/2010 |
| WO | WO 2011/093188 A1 | 8/2011 |
| WO | WO 2011/093236 A1 | 8/2011 |

OTHER PUBLICATIONS

Akeda, JP 2006-012784 Machine Translation, Jan. 12, 2006.*
Ide et al, JP 2010-235874 Machine Translation, Oct. 21, 2010.*

OTHER PUBLICATIONS

Kawasaki et al, JP 2011-052148 Machine Translation, Mar. 17, 2011.*
Schauhoff et al, JP 2011-225880 Machine Translation, Nov. 10, 2011.*
Written Opinion of the International Searching Authority issued in PCT/JP2012/074389 mailed Dec. 18, 2012.

* cited by examiner

Primary Examiner — Jessica E Whiteley
(74) Attorney, Agent, or Firm — Oliff PLC

(57) ABSTRACT

There is provided a curable resin composition that exhibits high adhesive properties to materials such as glass, copper, aluminum, PET, and PC, which have been regarded as poor adherends relative to photo-curable compositions, and high adhesive properties also between adherends different from each other. A curable resin composition including a polyene compound of Formula (1):

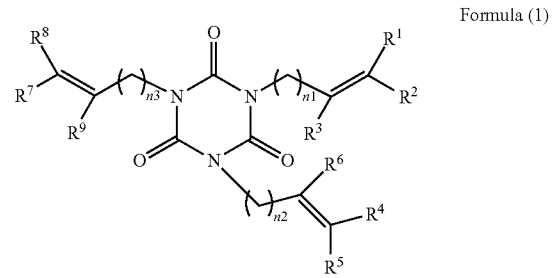

Formula (1)

(where n1, n2, and n3 are each independently an integer of 2 to 4; and $R^1$ to $R^9$ are each independently a hydrogen atom or a $C_{1-10}$ alkyl group). The composition may further include a thiol compound or a photopolymerization initiator. The thiol compound may be a compound having two to six thiol groups in the molecule, or be an aliphatic thiol, or be produced by a reaction of an aliphatic mercapto carboxylic acid and a polyhydric alcohol. The polyhydric alcohol may be an aliphatic polyhydric alcohol or hydroxyalkyl isocyanurate.

4 Claims, No Drawings

PHOTO-CURABLE RESIN COMPOSITION

TECHNICAL FIELD

The present invention relates to a polyene-based curable resin composition and further to a photo-curable resin composition utilizing a photo-curing reaction of a polyene and a thiol compound, the compositions having increased adhesive strength.

BACKGROUND ART

In recent years, resin compositions curable by irradiation of activating rays such as ultraviolet rays have been used in various fields as adhesives, coating agents, and the like. A resin composition containing a polyene compound and a polythiol compound as its components has been known as one of the photo-curable resin compositions of this type (see Patent Document 1 to Patent Document 5).

The resin composition containing a polyene and a polythiol as its components has excellent transparency in a visible light region (400 to 800 nm), adhesive properties, and curing properties at the surface thereof in the air (hereinafter referred to as "surface curing properties"). Therefore, the resin composition has been used in various fields of optical components, electronic components, and the like as an adhesive for glass, transparent plastics, or the like.

In the recent opto-electronics field, the demand for adhesives having higher adhesive properties has increased with equipment performance improvement. A composition mainly including an acrylic raw material has been generally known as a photo-curable composition having high adhesive strength. Such an acrylic photo-curable resin composition has been known to suffer curing inhibition by oxygen in the air. The composition has thus required consideration, for example, performing nitrogen substitution for curing, or quickly curing the composition by exposure to light with high illuminance, in order to cure the surface thereof favorably. In addition, acrylic adhesives do not have strong adhesive properties to foil (adherend) of a metal such as copper or nickel that is used for a printed board or an electric member in which the metal foil is formed on a substrate such as glass and translucent resin. It has thus been difficult to apply the acrylic adhesives to the field of substrates and electric members.

A curable composition containing a polyene and a polythiol as raw materials has been developed as a photo-curable composition having higher adhesive strength (see Patent Document 6).

A triene and thiol-based cured product using an isocyanuric acid-based triene compound is disclosed for the purpose of improving heat resistance (see Patent Documents 7 and 8). Examples of the triene compound in the cured product include allyl alcohol derivatives, and triallyl isocyanurate is used particularly in view of reactivity with a compound having a mercapto group.

A composition in which a curable composition containing a polyene and a polythiol as raw materials is blended with various kinds of additives has been developed in order to increase the adhesive force (see Patent Document 9).

PRIOR ART DOCUMENTS

Patent Documents

Patent Document 1: Japanese Patent Application Publication No. H03-243626 (JP 03-243626 A)

Patent Document 2: Japanese Patent Application Publication No. H07-003025 (JP 07-003025 A)

Patent Document 3: Japanese Patent Application Publication No. 2001-194510 (JP 2001-194510 A)

Patent Document 4: Japanese Patent Application Publication No. 2002-182002 (JP 2002-182002 A)

Patent Document 5: Japanese Patent Application Publication No. 2003-277505 (JP 2003-277505 A)

Patent Document 6: Japanese Examined Patent Application Publication No. S63-020255 (JP 63-020255 B)

Patent Document 7: Japanese Patent Application Publication No. H06-306172 (JP 06-306172 A)

Patent Document 8: Japanese Patent Application Publication No. 2001-026608 (JP 2001-026608 A)

Patent Document 9: Japanese Patent Application Publication No. 2009-007430 (JP 2009-007430 A)

DISCLOSURE OF THE INVENTION

Problem to be Solved by the Invention

For the curable composition disclosed in Patent Document 6 containing a polyene and a polythiol as raw materials, a curable resin thereof has a glass transition temperature of less than 20° C., and thus cannot achieve high adhesive properties in the field of substrates requiring heating process. A triene and thiol-based curing agent composition disclosed in Patent Documents 7 and 8 using triallyl isocyanurate as the triene compound has no sufficient adhesive force.

Also, the curable composition disclosed in Patent Document 9 that contains a polyene and a polythiol as raw materials and in which various kinds of additives are blended has no sufficient adhesive force and further is effective for limited adherends.

It is an object of the present invention to provide a polyene-based or polyene-polythiol-based curable resin composition that exhibits high adhesive properties to materials such as, besides glass, copper, aluminum, PET, and PC, which have been regarded as poor adherends relative to photo-curable compositions, and that is applicable to the fields of electronic components, optical components, precision mechanical components, liquid crystal display members, and the like, and to provide an adhesive using the same.

Means for Solving the Problem

The inventors of the present invention have employed a specific structure in which unsaturated linkage groups are bonded to a triazinetrione ring through long chain linkage groups, on a polyene compound in a polyene-based or polyene-polythiol-based curable resin composition. The inventors have thus found that a cured product or a cured coating that is excellent in both adhesive characteristics and optical properties can be formed by photo-curing the curable resin composition and have achieved the present invention.

Specifically, the present invention provides, as a first aspect, a curable resin composition comprising: a polyene compound of Formula (1):

Formula (1)

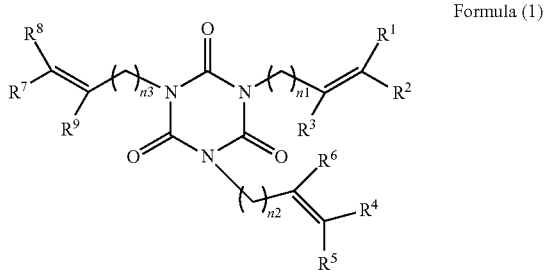

(where n1, n2, and n3 are each independently an integer of 2 to 4; and $R^1$ to $R^9$ are each independently a hydrogen atom or a $C_{1-10}$ alkyl group);

As a second aspect, the curable resin composition according to the first aspect, in which $R^1$ to $R^9$ are each a hydrogen atom;

As a third aspect, the curable resin composition according to the first aspect or the second aspect, further comprising: a thiol compound;

As a fourth aspect, the curable resin composition according to the third aspect, in which the thiol compound has two to six thiol groups in one molecule;

As a fifth aspect, the curable resin composition according to the third aspect or the fourth aspect, in which the thiol compound is an aliphatic thiol;

As a sixth aspect, the curable resin composition according to any one of the third aspect to the fifth aspect, in which the thiol compound is produced by a reaction of an aliphatic mercapto carboxylic acid and a polyhydric alcohol;

As a seventh aspect, the curable resin composition according to the sixth aspect, in which the polyhydric alcohol is an aliphatic polyhydric alcohol, a bivalent hydroxyalkyl isocyanurate, or a trivalent hydroxyalkyl isocyanurate;

As an eighth aspect, the curable resin composition according to any one of the first aspect to the seventh aspect, further comprising: a photopolymerization initiator; and As a ninth aspect, the curable resin composition according to the eighth aspect, in which the photopolymerization initiator is a radical photopolymerization initiator.

Effects of the Invention

The polyene compound of Formula (1) has a structure in which unsaturated linkage groups are bonded to a triazinetrione ring through long side chains. This structure increases the viscous term in the viscoelasticity of a cured product and a cured coating of the curable resin composition of the present invention and allows the cured product and the cured coating to have high adhesive strength. Consequently, the cured product and the cured coating produced from the curable resin composition containing, besides the polyene compound, a thiol compound can achieve both excellent optical properties and high adhesive strength. For this reason, the curable resin composition can be suitably used for adhesion of not only glass but also conventional poor adherends such as copper, aluminum, PET, and PC, to translucent materials.

The curable resin composition of the present invention is cured by UV irradiation that can be performed at low temperatures and thus is applicable to adhesion to heat sensitive materials (base materials).

MODES FOR CARRYING OUT THE INVENTION

The present invention relates to a polyene-based or polyene-polythiol-based curable resin composition, an adhesive produced from the resin composition, and an adherend and an optical member that are each bonded using the adhesive. The term "poly" in the present invention indicates polyfunctionality of at least difunctionality.

In a conventional adhesive produced from a polyene-polythiol-based resin composition, triallyl isocyanurate has been used as the polyene compound, particularly in terms of reactivity with a compound having a mercapto group. However, the adhesive is not always satisfactory in view of adhesive force to various types of adherends.

In contrast, in the present invention, as shown in Formula (1), the side chains at positions between the triazinetrione ring and the unsaturated linkage groups substituting the ring are elongated to be long chains. This controls the viscoelasticity of a cured product of a composition containing the compound of Formula (1) and a cured product of a composition containing the compound of Formula (1) and a thiol compound to increase the adhesive force thereof. More specifically, it is presumed that for the viscoelasticity of the cured product of the curable resin composition of the present invention, the contribution of the viscous term increases due to the elongated side chains of the polyene compound, which increases the adhesive strength to various types of adherends.

The photo-curable materials containing a liquid polyene compound including unsaturated linkages of the present invention has characteristics such as rapid curing properties, transparency, and small cure shrinkage and is usable in coating and adhesion of electronic components, optical components, and precision mechanical components. The photo-curable materials are usable in adhesion of, for example, mobile phones, optical elements such as lenses of cameras, light emitting diodes (LEDs) and semiconductor lasers (LDs), liquid crystal panels, biochips, components such as the lenses and prisms of cameras, magnetic components of hard disks of personal computers or other devices, pickups (parts receiving light information reflected from a disk) of CD and DVD players, cones and coils of speakers, magnets of motors, circuit boards, electronic components, and components inside the engines of automobiles.

Examples of applications of the curable resin composition of the present invention to ink materials to be printed on metals such as aluminum, plastics, or other materials include: applications to ink for printing on cards such as credit cards and membership cards, and switches and keyboards of electrical appliances and OA equipment; and applications to ink for inkjet printers on CDs, DVDs, and the like. Further examples thereof include: applications to a technique to produce a complicated three-dimensional object by curing the resin in combination with a three-dimensional CAD; applications to optical shaping such as model fabrication of industrial products; and applications to the coating, the adhesion, and optical waveguides of optical fibers, and thick film resists (for MEMS).

The curable resin composition of the present invention is a curable resin composition containing the polyene compound of Formula (1).

In Formula (1), n1, n2, and n3 are each independently an integer of 2 to 4, that is, an ethylene group, a propylene group, or a butylene group. $R^1$ to $R^9$ are each independently a hydrogen atom or a $C_{1-10}$ alkyl group.

Examples of the $C_{1-10}$ alkyl group include a methyl group, an ethyl group, an n-propyl group, an i-propyl group, a cyclopropyl group, an n-butyl group, an i-butyl group, an s-butyl group, a t-butyl group, a cyclobutyl group, a 1-methyl-cyclopropyl group, a 2-methyl-cyclopropyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a cyclopentyl group, a 1-methyl-cyclobutyl group, a 2-methyl-cyclobutyl group, a 3-methyl-cyclobutyl group, a 1,2-dimethyl-cyclopropyl group, a 2,3-dimethyl-cyclopropyl group, a 1-ethyl-cyclopropyl group, a 2-ethyl-cyclopropyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a cyclohexyl group, a 1-methyl-cyclopentyl group, a 2-methyl-cyclopentyl group, a 3-methyl-cyclopentyl group, a 1-ethyl-cyclobutyl group, a 2-ethyl-cyclobutyl group, a 3-ethyl-cyclobutyl group, a 1,2-dimethyl-cyclobutyl group, a 1,3-dimethyl-cyclobutyl group, a 2,2-dimethyl-cyclobutyl group, a 2,3-dimethyl-cyclobutyl group, a 2,4-dimethyl-cyclobutyl group, a 3,3-dimethyl-cyclobutyl group, a 1-n-propyl-cyclopropyl group, a 2-n-propyl-cyclopropyl group, a 1-i-propyl-cyclopropyl group, a 2-i-propyl-cyclopropyl group, a 1,2,2-trimethyl-cyclopropyl group, a 1,2,3-trimethyl-cyclopropyl group, a 2,2,3-trimethyl-cyclopropyl group, a 1-ethyl-2-methyl-cyclopropyl group, a 2-ethyl-1-methyl-cyclopropyl group, a 2-ethyl-2-methyl-cyclopropyl group, and a 2-ethyl-3-methyl-cyclopropyl group.

The polyene compound of Formula (1) where $R^1$ to $R^9$ are all hydrogen atoms is preferably used.

Examples of the polyene compound of Formula (1) include the following:

Formula (1-1)

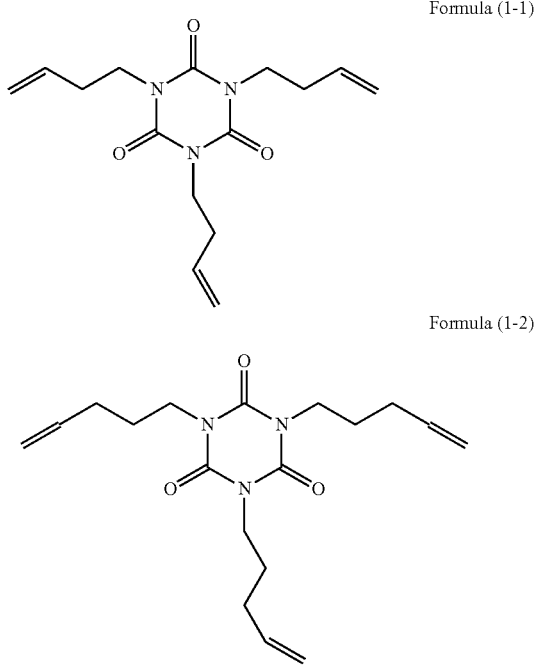

Formula (1-2)

Formula (1-3)

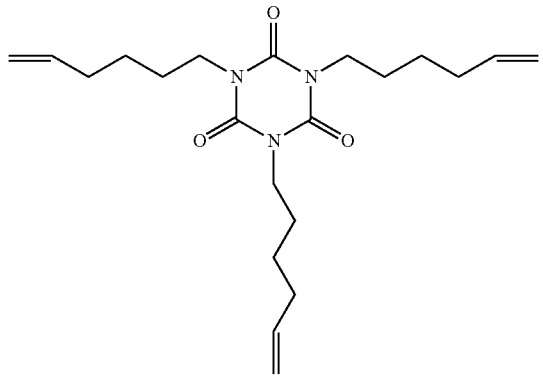

The polyene compound used in the present invention, for example, the compound of Formula (1-2), can be produced by the method below. Other polyene compounds can also be produced by a similar method.

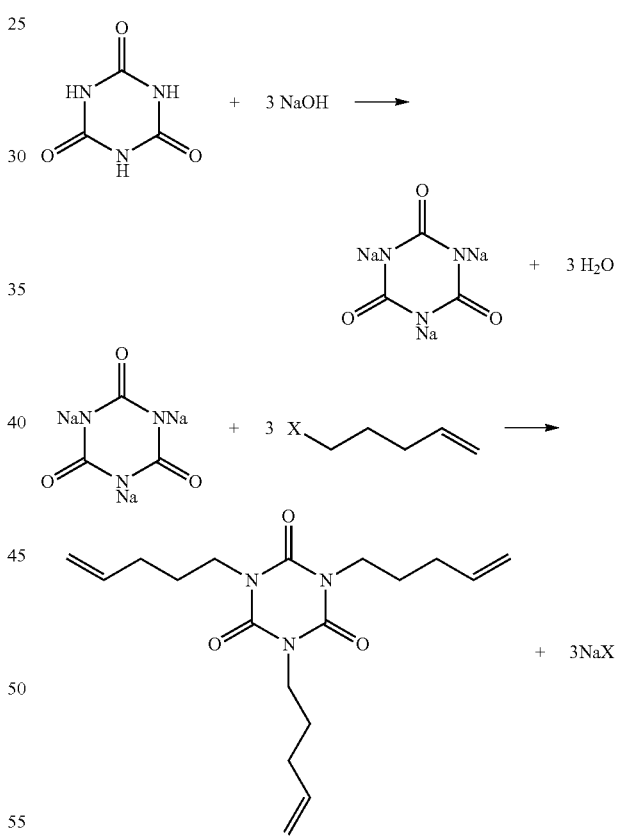

In this reaction, isocyanuric acid is converted into an isocyanuric acid Na salt using sodium hydroxide. This reaction can be performed in a water solvent at 0° C. to 100° C. for 1 to 10 hours. The isocyanuric acid Na salt is further caused to react with an alkene having a leaving group to produce an alkene substituted isocyanuric acid. This reaction can be performed, for example, in a solvent such as dimethylformamide (DMF) at 0° C. to 150° C. for 1 to 10 hours. In the formulae, X is a leaving group such as a chlorine atom, a bromine atom, an iodine atom, a methanesulfonyloxy group, a trifluoromethanesulfonyloxy group, a toluenesulfonyloxy group, a nitrobenzenesulfonyloxy group, an acetyloxy group, and a trifluoroacetyloxy group.

An alkene substituted isocyanuric acid can also be produced by causing isocyanuric acid to directly react with an alkene having a leaving group. This reaction can be performed using a solvent such as DMF and a base such as sodium hydride, potassium carbonate, tert-butoxypotassium, and triethylamine at a temperature from room temperature (20° C., for example) to the boiling point of the solvent for 0 to 100 hours.

The thiol compound that can be used in the present invention is a compound having at least two thiol groups in one molecule. The thiol compound can be, preferably, a compound having two to six thiol groups in one molecule.

The thiol compound is an aliphatic thiol and can be produced by esterification reaction of an aliphatic mercapto carboxylic acid and a polyhydric alcohol.

Examples of the polyhydric alcohol include an aliphatic polyhydric alcohol, a bivalent hydroxyalkyl isocyanurate, or a trivalent hydroxyalkyl isocyanurate.

The aliphatic mercapto carboxylic acid is a $C_{1-10}$ mercapto carboxylic acid, and examples thereof include thioglycollic acid and mercaptopropionic acid.

Examples of the aliphatic polyhydric alcohols include ethylene glycol, propylene glycol, 1,4-butanediol, 1,6-hexanediol, glycerin, trimethylolpropane, pentaerythritol, and sorbitol.

The hydroxyalkyl isocyanurate to be used is a hydroxyalkyl isocyanurate including a linear or branched alkyl group having a carbon atom number of 2 to 6. For example, tris(2-hydroxyethyl)isocyanurate can be preferably used.

Examples of such a thiol compound include a trimethylolpropane trimerucaptopropionic acid ester, a pentaerythritol tetramerucaptopropionic acid ester, and a trimerucaptopropionic acid ester of tris(2-hydroxyethyl)isocyanurate.

In the present invention, the blend ratio of the polyene compound and the thiol compound can be in a range of 5:1 to 1:5, preferably, 3:1 to 0.9:1, and further preferably, 1:1, in a molar ratio.

The photopolymerization initiator is blended in order to sensitize a resin composition with activating rays such as ultraviolet rays and visible rays so as to promote photocuring of the resin composition. Various kinds of known photopolymerization initiators are usable for the photopolymerization initiator. As the photopolymerization initiator, a radical photopolymerization initiator can be used.

Specific examples thereof include 1-hydroxycyclohexylphenyl ketone, benzophenone, p-methoxybenzophenone, acetophenone, propiophenone, thioxanthone, 2,2-dimethoxy-2-phenylacetophenone, 2,2-dimethoxy-1,2-diphenylethan-1-one, 2,2-diethoxy-2-phenylacetophenone, 2-hydroxy-2-methyl-1-phenylpropan-1-one benzoin methyl ether, benzoin ethyl ether, p-chlorobenzophenone, 4-benzoyl-4-methyldiphenyl sulfide, 2-benzil-2-dimethylamino-1-(4-morpholinophenyl)-butanone-1,2-methyl-1-[4-(methylthio)phenyl]-2-morpholinopropanone-1, bis(2,4,6-trimethylbenzoyl)-phenylphosphine oxide, 2,4,6-trimethylbenzoyl-diphenylphosphine oxide, 1,2-octanedione, and 1-[4-(phenylthio)-2-(O-benzyloxime)]. Among these, 1-hydroxycyclohexylphenyl ketone (radical photopolymerization initiator) is preferable in view of, for example, compatibility with resin and less yellowing during curing, but this is not a limiting example.

The photopolymerization initiators can be used singly or in combination of two or more of them. The amount of the photopolymerization initiator to be blended is 0.001 to 20 parts by mass and preferably 0.1 to 15 parts by mass per 100 parts by mass of the total amount of the polyene compound and the thiol compound.

To the curable resin composition of the present invention, the following additives may be added as needed, such as, a silane coupling agent, an antioxidant, a light stabilizer, a hardening accelerator, a dye, a filler, a pigment, a thixotropy imparting agent, a plasticizer, a surfactant, a lubricant, and an antistatic agent.

The mixture of the polyene compound and the thiol compound of the present invention may be reacted in advance to be used as a prepolymer. Examples of the method for producing a prepolymer by reacting the compounds in advance include a method (1) for simply heating the mixture of the polyene compound and the thiol compound, a method (2) for adding an organic peroxide or the like in a small amount and heating, and a method (3) for adding a photopolymerization initiator in a small amount and irradiating with ultraviolet rays. The method (1) is preferable in view of reaction speed control. The temperature for the reaction is preferably 5° C. to 70° C. in terms of the reaction speed control.

EXAMPLES

Synthesis Example 1

Synthesis of Tris(3-butenyl)isocyanurate 500 g of isocyanuric acid and 2000 ml of water were added into a reaction container to form slurry. 968 g of a solution of 48% of sodium hydroxide was added dropwise to the slurry, and the mixture was reacted at a temperature of 60° C. to 70° C. for 3 hours. After the reaction, water was distilled away therefrom, and the resultant reaction product was washed with methanol and then dried to yield 760 g of sodium isocyanurate as white crystals. 1107 ml of dimethylformamide was charged as a solvent into a reaction container equipped with a stirrer and a condenser, and 415 g of the sodium isocyanurate and 875 g of 4-bromo-1-butene were reacted therein at 90° C. to 98° C. for 8 hours. After the reaction, an inorganic salt was filtrated for separation, and the resultant reaction product was extracted with toluene, washed with water, and dried. The solvent was distilled away from the resultant reaction product to yield 404 g of tris(3-butenyl)isocyanurate as a vermilion oily product. This crude product was able to yield 348 g of a transparent oily product by being purified by silica-gel chromatography. The yielded polyene compound was tris(3-butenyl)isocyanurate. This polyene compound was designated as (1-1).

$^1$H-NMR (270 MHz, CDCl$_3$): δ=5.85-5.79 (m, 3H), 5.07-5.00 (m, 6H), 3.98-3.89 (m, 6H), 2.44-2.36 (m, 6H), $^{13}$C-NMR (67 MHz, CDCl$_3$): δ=148.6, 134.0, 117.3, 41.9, 32.1

Synthesis Example 2

Synthesis of Tris(4-pentenyl)isocyanurate 396 g of isocyanuric acid and 1585 ml of water were added to a reaction container to form slurry. 768 g of a solution of 48% of sodium hydroxide was added dropwise to the slurry, and the mixture was reacted at a temperature of 60° C. to 65° C. for 2 hours. After the reaction, water was distilled away therefrom, and the resultant reaction product was washed with methanol and then dried to yield 596 g of sodium isocyanurate as white crystals. The similar operation was repeated to yield 609 g of sodium isocyanurate as white crystals. 2500 ml of dimethylformamide was charged as a solvent into a reaction container equipped with a stirrer and a condenser, and 1004 g of the sodium isocyanurate and 2306 g of 5-bromo-1-pentene were reacted therein at 120° C. to 125° C. for 8 hours. After the reaction, an inorganic salt was filtrated for separation, and the resultant reaction product was extracted with toluene, washed with water, and dried. The solvent was distilled away from the resultant reaction product to produce 1484 g of tris(4-pentenyl) isocyanurate as a brown oily product. This crude product was able to yield 1210 g of a transparent oily product by being purified by silica-gel chromatography. The yielded polyene compound was tris(4-pentenyl)isocyanurate. This polyene compound was designated as (1-2).

$^1$H-NMR (600 MHz, CDCl$_3$): δ=5.85-5.78 (m, 3H), 5.07-4.98 (m, 6H), 3.90-3.87 (m, 6H), 2.13-2.10 (m, 6H), 1.78-1.73 (m, 6H)

$^{13}$C-NMR (150 MHz, CDCl$_3$): δ=148.8, 137.2, 115.2, 42.5, 30.7, 26.6

Synthesis Example 3

Synthesis of Tris(5-hexenyl)isocyanurate 500 g of isocyanuric acid and 2000 ml of water were added to a reaction container to form slurry. 968 g of a solution of 48% of sodium hydroxide was added to the slurry, and the mixture was reacted at a temperature of 60° C. to 70° C. for 3 hours. After the reaction, water was distilled away therefrom, and the resultant reaction product was washed with methanol and then dried to yield 760 g of sodium isocyanurate as white crystals. 728 ml of dimethylformamide was charged as a solvent into a reaction container equipped with a stirrer and a condenser, and 279 g of the sodium isocyanurate and 701 g of 6-bromo-1-hexene were reacted therein at 120° C. to 125° C. for 3 hours. After the reaction, an inorganic salt was filtrated for separation, and the resultant reaction product was extracted with toluene, washed with water, and dried. The solvent was distilled away from the resultant reaction product to yield 541 g of tris(5-hexenyl)isocyanurate as a brown oily product. This crude product was able to yield 401 g of a transparent oily product by being purified by silica-gel chromatography. The yielded polyene compound was tris(5-hexenyl)isocyanurate. This polyene compound is designated as (1-3).

$^1$H-NMR (600 MHz, CDCl$_3$): δ=5.82-5.75 (m, 3H), 5.03-4.94 (m, 6H), 3.88-3.86 (m, 6H), 2.11-2.09 (m, 6H), 1.67-1.59 (m, 6H), 1.45-1.40 (m, 6H)

$^{13}$C-NMR (150 MHz, CDCl$_3$): δ=148.8, 138.1, 114.7, 42.7, 33.2, 27.1, 25.9

Triallyl isocyanurate (manufactured by Sigma-Aldrich Co. LLC.) was prepared as a polyene compound. This polyene compound was designated as (1-4).

[Preparation of Polythiol Compound]

The following polythiol compounds manufactured by SC Organic Chemical Co., Ltd. were prepared.
Trimethylolpropane tris(3-mercaptopropionate) (TMMP)
Tris-[3-mercaptopropionyloxy)-ethyl]-isocyanurate (TEMPIC)
Pentaerythritol tetrakis(3-mercaptopropionate) (PEMP)
Dipentaerythritol hexakis(3-mercaptopropionate) (DPMP)

[Preparation of Photopolymerization Initiator]
Irgacure 184 manufactured by BASF Corporation (the component was 1-hydroxycyclohexylphenyl ketone) was prepared.

[Preparation of Polymerization Inhibitor]
N-Nitrosophenylhydroxylamine aluminum salt (NPHA Al) manufactured by Wako Pure Chemical Industries, Ltd. was prepared.

[Photo-curing Properties Test on Photo-curable Resin Composition]
An irradiation amount until the completion of curing was measured using a photo-DSC in order to confirm the photo-curing properties of each compound. As a common blend, 1 phr of the photopolymerization initiator Irgacure 184 was added relative to the total amount of the polyene and polythiol compounds. Here, phr is a mass ratio of the photopolymerization initiator per 100 parts by mass of the total of the polyene compound and the thiol compound. 2000 ppm of the polymerization inhibitor NPHA A1 was added relative to the polyene compound.

(Measurement Conditions of Photo-DSC)
Light source: a xenon lamp and a 365 nm band-pass filter were used.
Illuminance: 5 mW/cm$^2$ (detection at 365 nm)
Device name: DSC204F1 Phoenix (manufactured by NETZSCH)

TABLE 1

(Reference Example) Irradiation Amount Until Curing Completion (J/cm$^2$)

| Polyene component | (1-1) | (1-2) | (1-3) | (1-4) |
|---|---|---|---|---|
| TMMP | 0.41 | 0.38 | 0.31 | 0.63 |
| TEMPIC | 0.46 | 0.44 | 0.20 | 0.41 |
| PEMP | 0.48 | 0.44 | 0.24 | 0.34 |
| DPMP | — | 0.50 | — | 0.52 |

[Adhesive Properties Test/180 Degree Peel Test]
(Preparation of Test Piece)
White glass (BK7) was prepared as a rigid adherend. Copper foil (electrolytic copper foil, manufactured by Furukawa Circuit Foil Co., Ltd., the smooth surface was used as a surface for adhesion), aluminum foil (manufactured by Nippon Foil Mfg. Co., Ltd.), PET films (Lumirror S10, manufactured by Toray Industries, Inc.), and PC films (polycarbonate films, manufactured by International Chemical Co., Ltd.) were prepared as flexible adherends. Each of the adherends was subjected to degreasing treatment using ethanol before adhesion.

The adhesives of Examples 1 to 6 and Comparative Examples 1 and 2 were each prepared by blending corresponding components according to Tables 2 and 4. The liquid of each adhesive was applied to the center of white glass (BK7) substrate along the longitudinal direction. As a spacer, several pieces of glass beads (a diameter of 100 μm) per 1 cm$^2$ were added to the surface to which the adhesive was applied to provide an adhesion space. Each base material film (each of the flexible adherends) was laid gently on the corresponding adhesion space. This test piece was turned upside down, and then a columnar weight of 1 kg was rolled over the piece to uniform the film thickness. The redundant adhesive liquid flown from the test piece was wiped off, and UV was radiated through the white glass surface (exposure value: about 1000±50 mJ/cm$^2$, 85 seconds) to cure the adhesive.

(Conditions for 180 Degree Peel Test)
Test method: according to JIS K6854-2.
Test piece: a width of 25 mm
Test speed: 50 mm/min
Peeling distance: 100 mm
Test temperature: 23±1° C.

Measurement number: n=3

Device name: 5582 universal testing machine (manufactured by Instron Corporation)

Tables 3 and 5 show the 180 degree peel test results.

The following tests were performed using each adhesive: an 180 degree peel test between glass and aluminum foil, an 180 degree peel test between glass and copper foil, an 180 degree peel test between glass and a PET film, and an 180 degree peel test between glass and a PC film.

TABLE 2

Adhesive Blend Composition (unit: g)

| Component | Example 1 | Example 2 | Example 3 | Comparative Example 1 |
|---|---|---|---|---|
| (1-1) | 36.5 | | | |
| (1-2) | | 39.0 | | |
| (1-3) | | | 42.5 | |
| (1-4) | | | | 32.5 |
| TEMPIC | 65.8 | 61.5 | 59.5 | 68.5 |
| Irgacure 184 | 1.0 | 1.0 | 1.0 | 1.0 |
| NPHA Al | 0.073 | 0.078 | 0.085 | 0.065 |

TABLE 3

180 Degree Peel Test Result (unit: N/25 mm width)

| Adherend | Example 1 | Example 2 | Example 3 | Comparative Example 1 |
|---|---|---|---|---|
| Glass/aluminum foil | 16.4 | 12.2 | 3.8 | 1.1 |
| Glass/copper foil | 22.9 | 14.3 | 3.7 | 0.3 |
| Glass/PET film | 5.7 | 7.4 | 0.3 | 2.7 |
| Glass/PC film | 4.1 | 1.5 | 0.1 | 1.2 |

TABLE 4

Adhesive Blend Composition (unit: g)

| Component | Example 4 | Example 5 | Example 6 | Comparative Example 2 |
|---|---|---|---|---|
| (1-1) | 44.3 | | | |
| (1-2) | | 47.6 | | |
| (1-3) | | | 50.6 | |
| (1-4) | | | | 40.5 |
| PEMP | 55.7 | 52.4 | 49.4 | 59.5 |
| Irgacure 184 | 1.0 | 1.0 | 1.0 | 1.0 |
| NPHA Al | 0.089 | 0.095 | 0.101 | 0.081 |

TABLE 5

180 Degree Peel Test Result (unit: N/25 mm width)

| | Example 4 | Example 5 | Example 6 | Comparative Example 2 |
|---|---|---|---|---|
| Glass/aluminum foil | 7.0 | 3.6 | 2.2 | 1.4 |
| Glass/copper foil | 5.2 | — | — | 2.7 |
| Glass/PET film | 1.5 | — | — | 0.8 |
| Glass/PC film | 1.2 | — | — | 0.8 |

The invention claimed is:

1. A curable resin composition comprising:
a polyene compound of Formula (1):

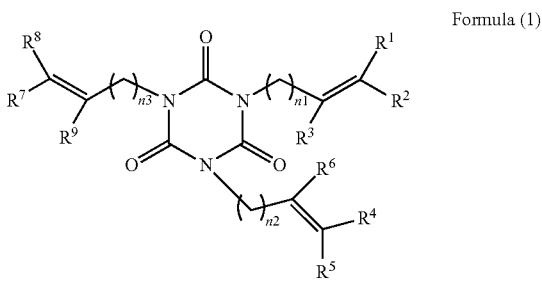

Formula (1)

wherein n1, n2, and n3 are each independently an integer of 2 to 4; and $R^1$ to $R^9$ are each independently a hydrogen atom or a $C_{1-10}$ alkyl group;
a thiol compound, wherein the thiol compound has two to six thiol groups in one molecule, the thiol compound is produced by a reaction of an aliphatic mercapto carboxylic acid and a polyhydric alcohol, and the polyhydric alcohol is a bivalent hydroxyalkyl isocyanurate or a trivalent hydroxyalkyl isocyanurate; and
a photopolymerization initiator,
wherein the polyene compound of Formula (1) and the thiol compound are mutual reaction substrates, and
the aliphatic mercapto carboxylic acid is a $C_{1-10}$ mercapto carboxylic acid.

2. The curable resin composition according to claim 1, wherein
$R^1$ to $R^9$ are each a hydrogen atom.

3. The curable resin composition according to claim 1, wherein
the photopolymerization initiator is a radical photopolymerization initiator.

4. A compound produced from the curable composition according to claim 1.

* * * * *